(Model.) 2 Sheets—Sheet 1.

J. TROWBRIDGE.
APPARATUS FOR NEUTRALIZING INDUCTION ON ELECTRICAL CIRCUITS.

No. 249,808. Patented Nov. 22, 1881.

Witnesses:
John M. Batchelder.
Isabel Batchelder.

Inventor:
John Trowbridge.

(Model.)

2 Sheets—Sheet 2.

J. TROWBRIDGE.
APPARATUS FOR NEUTRALIZING INDUCTION ON ELECTRICAL CIRCUITS.

No. 249,808.

Patented Nov. 22, 1881.

UNITED STATES PATENT OFFICE.

JOHN TROWBRIDGE, OF CAMBRIDGE, MASSACHUSETTS.

APPARATUS FOR NEUTRALIZING INDUCTION ON ELECTRICAL CIRCUITS.

SPECIFICATION forming part of Letters Patent No. 249,803, dated November 22, 1881.

Application filed January 24, 1881. (Model.)

*To all whom it may concern:*

Be it known that I, JOHN TROWBRIDGE, of Cambridge, in the county of Middlesex and State of Massachusetts, have invented a new and useful Improvement in Neutralizing Induction on Electrical Circuits, of which the following is a specification.

Figure 1:
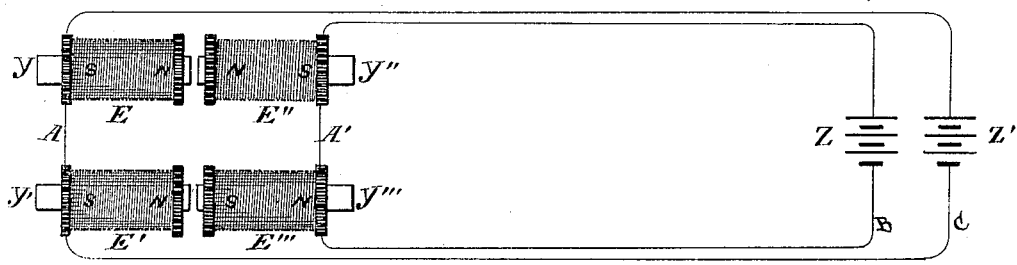
Figure 2:
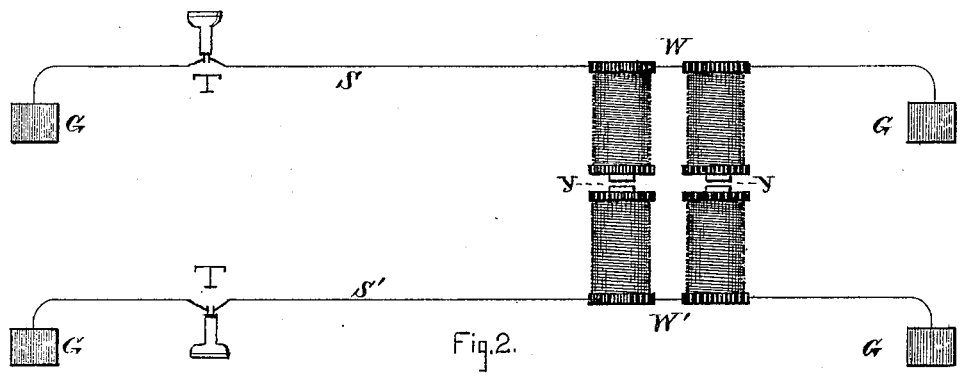
Figure 3:
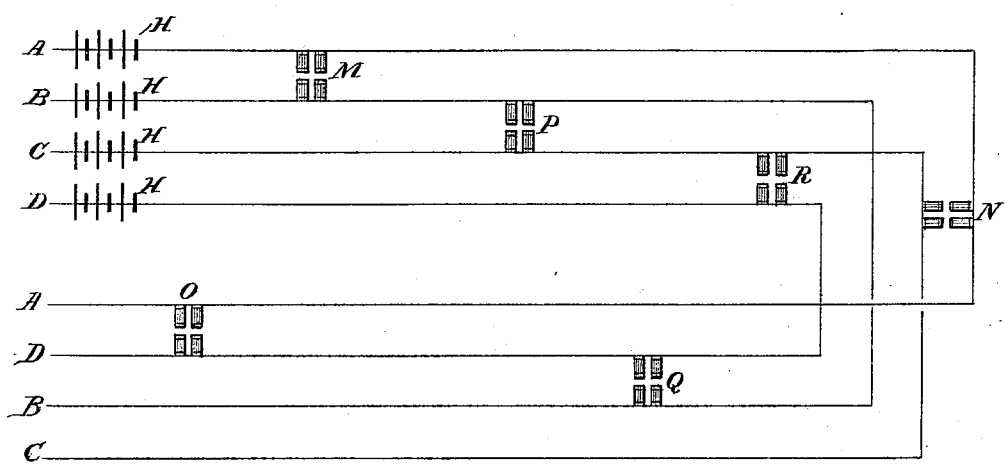
Figure 5:
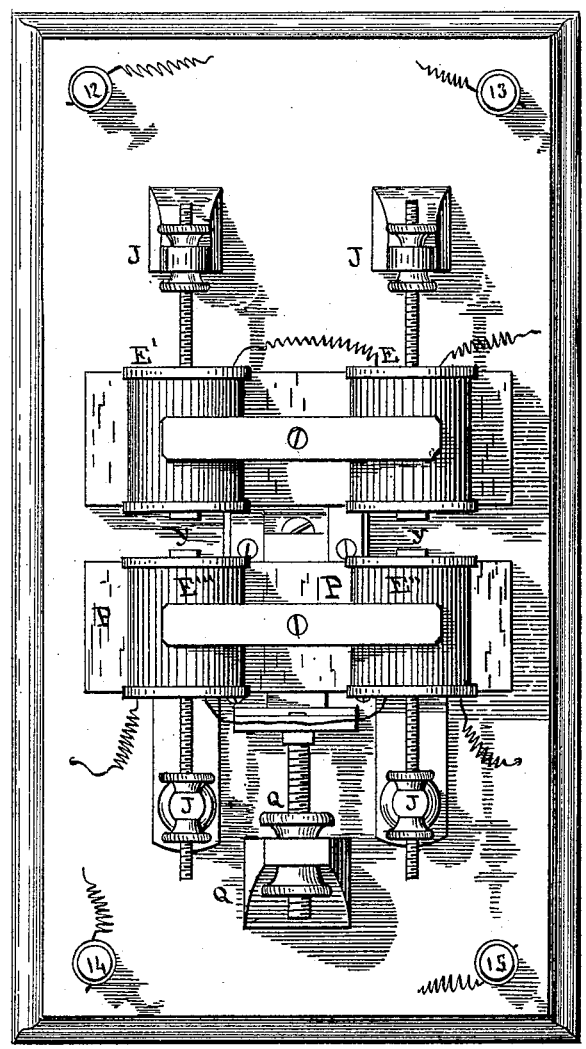
Figure 4:
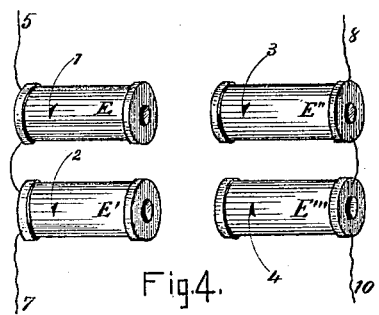

In the drawings making a part of this specification, Figure 1 shows the principle of the neutralizing and concentrating apparatus applied to continuous metallic circuits worked by batteries. Fig. 2 represents two telephone-lines with intervening stations at S S'. Fig. 3 shows numerous circuits worked by batteries and employing the earth as a return-circuit. Fig. 4 shows the direction in which the wire is wound upon the coils. Fig. 5 is a plan, showing the mode of adjusting the coils and the cores of the electro-magnets with reference to the opposite magnets.

This system enables one to concentrate the induction which takes place along the whole length of neighboring electrical currents, or at any part of neighboring electrical circuits, at one or more points, and to neutralize this induction completely by the employment of a concentrating and neutralizing apparatus, made by a peculiar combination of adjustable electro-magnets with adjustable cores.

This system is especially applicable to the wires or conductors of telegraph and telephone lines. The former become more efficient, and in the latter the confused and buzzing sounds caused by induction are entirely prevented.

The position of the coils, the electro-magnets, and the wires leading thereto is shown in Fig. 5. The coils E E' are affixed to the base-board, and the coils E" E''' are movable, the block P upon which they rest being adjusted by turning the screw Q so as to place them at any required distance from the opposite coils. All of the cores $y$ are also movable, and are set as required by the adjusting-screws J. The screw-cups 12 and 13 receive the line-wires of the circuit A C, Fig. 1, and the cups 14 and 15 the line-wires of the circuit A' B.

Let A, Fig. 1, be any point on an electrical circuit A C, and A' a neighboring point on the circuit A' B. Let A C be one circuit and A' B another circuit near to A C. On circuit A C place two electro-magnets, E E', of suitable resistance, with magnetic cores $y$ $y'$. Wind these electro-magnets in the same directions, so that two south poles or two north poles shall be directed toward the end of two electro-magnets, E" and E''', with cores $y''$ $y'''$ placed on the circuit A' B. Wind the insulated wire of the electro-magnets E" E''', so that, viewed in the same direction, the wire on E''' shall be in the direction of a right-handed screw, and the wire on E''' shall be in the direction of a left-handed screw. Thus the opposite poles of E" and E''' will be side by side and opposite to the two south poles or the two north poles of the electro-magnets E and E' in the circuit A C. The wire of the magnets is wound as shown in Fig. 4, both coils of the pair E E' being wound in the same direction, as indicated by the arrows 1 and 2. In the other pair the wire of the coil E" is also wound in the same direction, as shown by the arrow 3, while the coil E''' is wound in the opposite direction, and is shown by the arrow 4. The wires leading to and from the coils are seen at 5-7 and 8-10. Adjust by means of suitable screws, Q and J, Fig. 5, the relative position of the electro-magnets, or the position of the iron cores with reference to the centers of the electro-magnets, until the induction arising throughout the circuit A C is neutralized by the electro-magnets E" and E''', or the induction arising throughout the circuit A' B is neutralized by the electro-magnets E and E' at A in the circuit A C. On both of the above-named circuits a battery is represented at Z Z'; but when the line is used as a telephonic circuit the batteries may be dispensed with.

I will now describe this system in its application to two electrical circuits.

In Fig. 2 two neighboring lines are represented extending from New York to Boston. The ground is used as a return-circuit, and the earth-plates G are represented at Boston and New York. The neutralizing system is shown at W W', and in this figure the arrangement of two lines is shown which are worked by magneto-electric induction. As heretofore used the effective action of lines thus situated with reference to each other is seriously impaired by the influence of induced currents; but when the electro-magnets W on one of the lines and W' on the other line are placed as before described, and referred to in Fig. 1, both of the lines are free to act, and messages or signals that are passing—between Boston and New York, for example—are distinctly understood at the termini or at S in Springfield, or at any intervening station that is provided with a telephone, T, or other suitable instrument. The action and the effects produced may be stated as follows: On making the current A C, Fig. 1, an induced current will arise in the neighboring circuit A' B in the opposite direction to the current in the circuit A C. On account of the method of winding the opposed electro-magnets, as herein described and represented in Fig. 4, the original current through A C will produce induced currents in opposite directions in the opposed electro-magnets on the circuit at the point where the neutralizing apparatus may be placed.

By regulating the distance between the opposed electro-magnets E E'' and E' E''', and by regulating the position of the adjustable cores $y$, the induction arising at any point of the circuit A' B can be neutralized by the induction arising at the point where the neutralizing apparatus is placed; or the distance between the adjustable electro-magnets and the distances between the adjustable cores can be regulated so that the induction arising at any point of the line A' B can be neutralized by the resultant induction between the electro-magnets E E'' and E' E'''. The same method and the same reasoning apply to the case of breaking the current in the neighboring circuit A C.

The mode of using the neutralizing-magnets on a series of neighboring telegraph or telephone lines or conductors is shown in Fig. 3. Let A B C D, &c., be any number of electrical circuits. The induction between neighboring lines can be neutralized by the employment of concentrating and neutralizing electro-magnets in pairs at the same point or at different points on these circuits, which may be wholly metallic or include the earth. Batteries H may or may not be used on these lines. The system of concentrating and neutralizing electro-magnets placed at M will neutralize the induction arising from the circuits A and B. The system at N will neutralize that arising from the circuits A and C, the system at O that from A and D, the system at P that from B and C, the system at Q that from B and D, the system at R that from C and D. In this manner the entire induction arising from any number of neighboring electrical circuits can be concentrated and neutralized at suitable points on the system of electrical circuits, leaving every wire of a series of wires throughout the whole length of the line in the same condition for efficient action as in detached lines using but one wire or conductor.

In regard to the size of these electro-magnets, I prefer to make them of the size of those used in the ordinary Morse sounder; but the size of the electro-magnets may be varied with different length of circuit, in order to produce the required neutralization.

It is to be understood that the electro-magnets above described in all cases form a part of the main lines through which messages are sent.

In the case where intermittent currents are used upon wires neighboring to a telephone-circuit, as might happen in the harmonic system of telegraphy, or in the case of the employment of alternating dynamo-electric machines, the apparatus herein described is used to great advantage, and will neutralize the induction arising from these intermittent currents.

What I claim, and desire to secure by Letters Patent, is—

The device for concentrating and neutralizing the induction at a certain point or points on an electrical circuit, consisting of electro-magnets in pairs, with the similar poles—that is, the two north or the two south poles—of one pair on one electrical circuit opposed to the opposite poles—that is, the north and south poles—of the other pair on a neighboring circuit, substantially as herein described.

JOHN TROWBRIDGE. [L. S.]

In presence of—
JOHN M. BATCHELDER,
ISABEL BATCHELDER.